United States Patent [19]

Vandierendonck

[11] 4,225,934
[45] Sep. 30, 1980

[54] MULTIFUNCTIONAL ARITHMETIC AND LOGIC UNIT IN SEMICONDUCTOR INTEGRATED CIRCUIT

[75] Inventor: Jerry L. Vandierendonck, Houston, Tex.

[73] Assignee: Texas Instruments Incorporated, Dallas, Tex.

[21] Appl. No.: 815,871

[22] Filed: Jul. 14, 1977

Related U.S. Application Data

[63] Continuation of Ser. No. 176,664, Aug. 31, 1971, Pat. No. 4,037,094.

[51] Int. Cl.² ............................................. G06F 7/50
[52] U.S. Cl. ............................................. 364/716
[58] Field of Search ........................................ 364/716

[56] References Cited
U.S. PATENT DOCUMENTS

| | | | |
|---|---|---|---|
| 3,231,725 | 1/1966 | Davis et al. | 364/738 |
| 3,454,310 | 7/1969 | Wilhelm, Jr. | 328/92 |
| 3,576,984 | 5/1971 | Gregg, Jr. | 364/716 |
| 3,584,207 | 6/1971 | Huddinge et al. | 364/716 |
| 3,596,074 | 7/1971 | Mitrofanoff | 364/716 |
| 3,596,075 | 7/1971 | Weelden | 364/716 |

OTHER PUBLICATIONS

Lucas, "An Accumulator Chip", *IEEE Trans. on Computers*, vol. C-18, No. 2, Feb. 1969, pp. 105-114.

*Primary Examiner*—David H. Malzahn
*Attorney, Agent, or Firm*—John G. Graham

[57] ABSTRACT

A computing system includes a central processor unit (CPU) in combination with external memory units. The CPU includes an arithmetic logic (ALU), an instruction register, a random access memory, and a control system for interconnecting the functional elements of the CPU via sequential use of a common parallel buss, enabling the CPU to be defined on a single chip. The ALU is capable of performing eight separate arithmetic and logic functions utilizing common logic gates.

1 Claim, 3 Drawing Figures

MULTIFUNCTIONAL ARITHMETIC AND LOGIC UNIT IN SEMICONDUCTOR INTEGRATED CIRCUIT

This is a continuation of Ser. No. 176,664, filed Aug. 31, 1971, now U.S. Pat. No. 4,037,094.

This invention relates to computing systems in general and more particularly to an ALU that utilizes common insulated-gate-field-effect-transistor logic gates to effect eight separate functions.

Numerous combinations of CPUs and external memory are available in industry, respectively offering a variety of advantages such as size, speed, cost, etc. Recently it has become particularly advantageous, especially from a cost viewpoint, to utilize a memory circuit that includes predominantly insulated-gate-field-effect-transistor devices. For most applications the memory must be compatible with transistor-transistor-logic (TTL) circuits. Problems typically associated with such a memory system relate to speed of operation, flexibility of use, and general size, it being desirable to reduce the area of semiconductor material required for the systems. From a fabrication and reliability viewpoint, it is desirable to minimize the number of external interconnections between various chips in the system.

One area of computing systems that typically requires a relatively large area of chip is the ALU. Conventionally, the various arithmetic and logic functions that can be performed by a CPU are performed by separate complex logic circuits. Such circuits require a large area and limit speed of operation of the CPU.

Accordingly, an object of the present invention is to provide an improved computing system.

An additional object of the invention is to provide an ALU that shares common logic to perform separate logic and arithmetic operations.

In accordance with the present invention, the ALU of a central processor for use in a computing system includes a common logic circuit for performing arithmetic operations. In the preferred embodiment, the ALU performs eight functions, add, add with carry, subtract, subtract with borrow, AND, OR, EXCLUSIVE OR, and COMPARE. Three bits of an instruction are coded to define the desired operation. A decode circuit receives these three inputs and provides a set of output control signals to the logic circuit. The logic circuit includes a complex logic OR-AND NOT gate for inverting the subtrahend in subtraction operations, a logic NAND gate for performing an AND function and for forming a carry generate signal for add and subtract operations; a first logic gate corresponding to the inverse of an EXCLUSIVE OR for performing an EXCLUSIVE OR operation and for providing the carry propagate term for add and subtract operations; a NAND logic gate for controlling the outputs of the OR and AND functions; a second logic gate corresponding to the inverse of an exclusive OR for controlling the output of the operation exclusive or and for forming the sum output of one bit of the ALU; and a carry circuit for generating a carry within a bit and for propogating a carry between bits for addition, subtraction and compare operations.

The ALU circuit offers the advantages of reduced number of gates for performing the arithmetic and logic operations with a corresponding reduction in size and increase in speed of operation.

For the detailed description of the invention and drawings, reference is made to U.S. Patent No. 4,037,094, issued July 19, 1977, which is incorporated herein by reference.

FIG. 3 is a logic diagram of one bit of the arithmetic logic unit of the single chip central processing unit of the present invention.

SYSTEM DESCRIPTION

Figure 1:
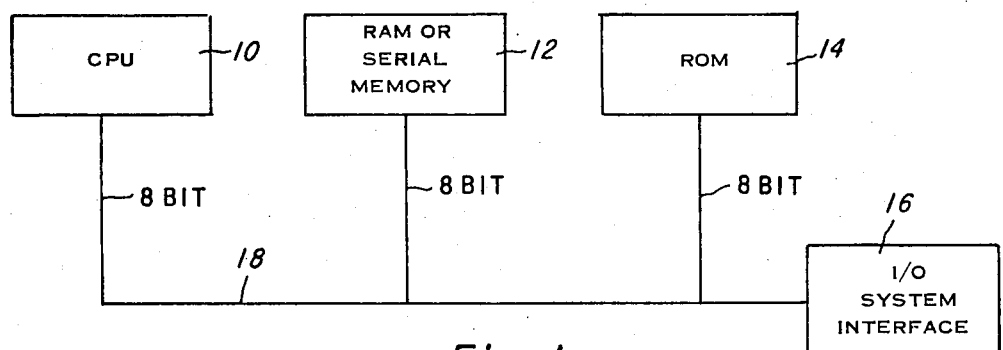
FIG. 1 is a functional block diagram illustrating a single chip central processing unit interconnected with external memory systems.

FIG. 1 illustrates in block diagram format a central processing unit 10, in external memory unit 12, and a read-only memory 14. These three units 10, 12, and 14 are interconnected by a common eight-bit parallel bus 18. An input/output system interface is indicated generally by block 16. This interface system enables external inputs and outputs to and from the CPU and memory unit 12.

In accordance with the present invention, the CPU 10 is integrated on a single chip. This has the advantage in that it enables fast execution time and a minimum number of leads necessary for interconnect to other elements of a computing system. The external memory 12 may be either a random access memory or a serial memory. As will be explained hereinafter with reference to the detailed description of FIG. 37, the logic of the external memory is designed so that either random access memory or a shift register type memory may be utilized.

The read-only memory (ROM) 14 is used in the system to store fixed subroutines or control programs. The CPU 10, memory 12, and read-only memory 14 are interconnected with each other and with the input/output interface 16 by a common eight-bit parallel bus 18. On one phase of the clock, the CPU or memory will output data; on the other phase of the clock, the CPU and memory will accept an input.

CPU ORGANIZATION

Figure 2:
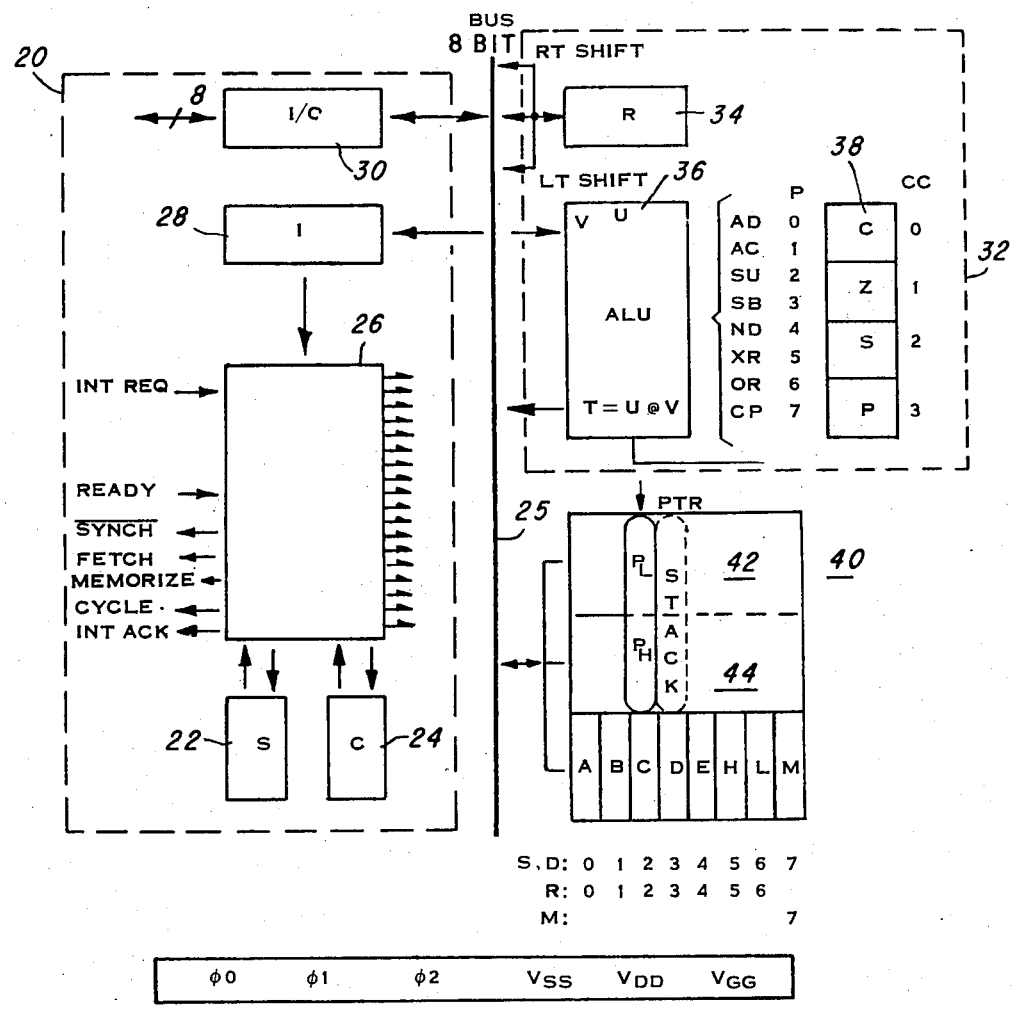
FIG. 2 is a functional block diagram of a one chip CPU which may be used in accordance with the present invention.

FIG. 2 is a functional block diagram of the CPU organization. The CPU consists basically of three blocks, the control decode 20, the ALU 32, and the internal RAM 40. The control section 20 controls CPU operation and synchronization such that communications between various blocks of the CPU may occur over the common eight-bit bus 25. The control section 20 includes a control decoder 26. This block has as inputs an interrupt request (INT REQ) and a ready (READY) signal. Outputs of the control decoder 26 include a $\overline{\text{SYNCH}}$, FETCH, CYCLE, interrupt acknowledge (INT ACK), and MEMORIZE signals. A master system timer 32, and a cycle timer 24 (which enables variable instruction lengths) are connected to the control decode block 26. An instruction register 28 also inputs information into the control decoder 26. The control decoder has 18 outputs which control the internal RAM, the ALU, and the system interface and external memory units. An input/output block 30 forms a part of the control section 20 and is interconnected to the internal bus 25. The detailed logic circuits associated with the various blocks of the control section 20 will be described with reference to FIGS. 8-15 hereinafter.

Block 32 generally depicts the ALU section of the CPU. The arithmetic logic unit includes a temporary storage register 34 which contains the shift right and shift left circuits. Block 36 refers generally to an eight-bit arithmetic unit. This unit can execute eight different functions, add, add with carry, subtract, subtract with borrow, NAND, exclusive or, OR, and compare. A code P corresponds to each of these arithmetic operations. As will be explained hereinafter with reference to the instruction set of the CPU, bits 5, 4, 3 of the instruction register contain binary information corresponding to these arithmetic operations. By way of example, subtract with borrow has a code P equal to 3. This would be a binary code of 011.

Block 38 represents the four arithmetic flags which indicate the status of data of an arithmetic operation. As may be seen, the four flags are carry (C), zero (Z), sign (S), and parity (P). The condition code (cc) corresponding to each of these condition flags is shown as 0, 1, 2, and 3, respectively. As understood by those skilled in the art, two bits of binary data may be used to uniquely select one of the four flags. The condition flag codes, and also the arithmetic operation codes P are shown in Table V hereinafter.

The internal RAM of the CPU is shown generally at 40. This RAM contains 26 eight-bit registers. Two of these registers are selected for program address. These two registers are indicated at 42 and 44, corresponding to the low order address bits ($P_L$) and the high order address bits ($P_H$) respectively. In combination, these two registers enable absolute 16-bit addressing of a location in memory. Using 16-bit memory addressing, it is possible to address up to 64K bytes of data in memory. The RAM also contains data registers A, B, C, D, E, H, L, and M. Data register A is used as the accumulator. Registers, B, C, D, and E are general purpose registers, and registers H and L are combined and contain the location of memory address. Data register M' is used internally only. Fourteen of the data registers in the internal RAM define a seven-level last-in-first-out stack (STACK). This has the advantage in that if facilitates calling subroutines.

Figure 5:
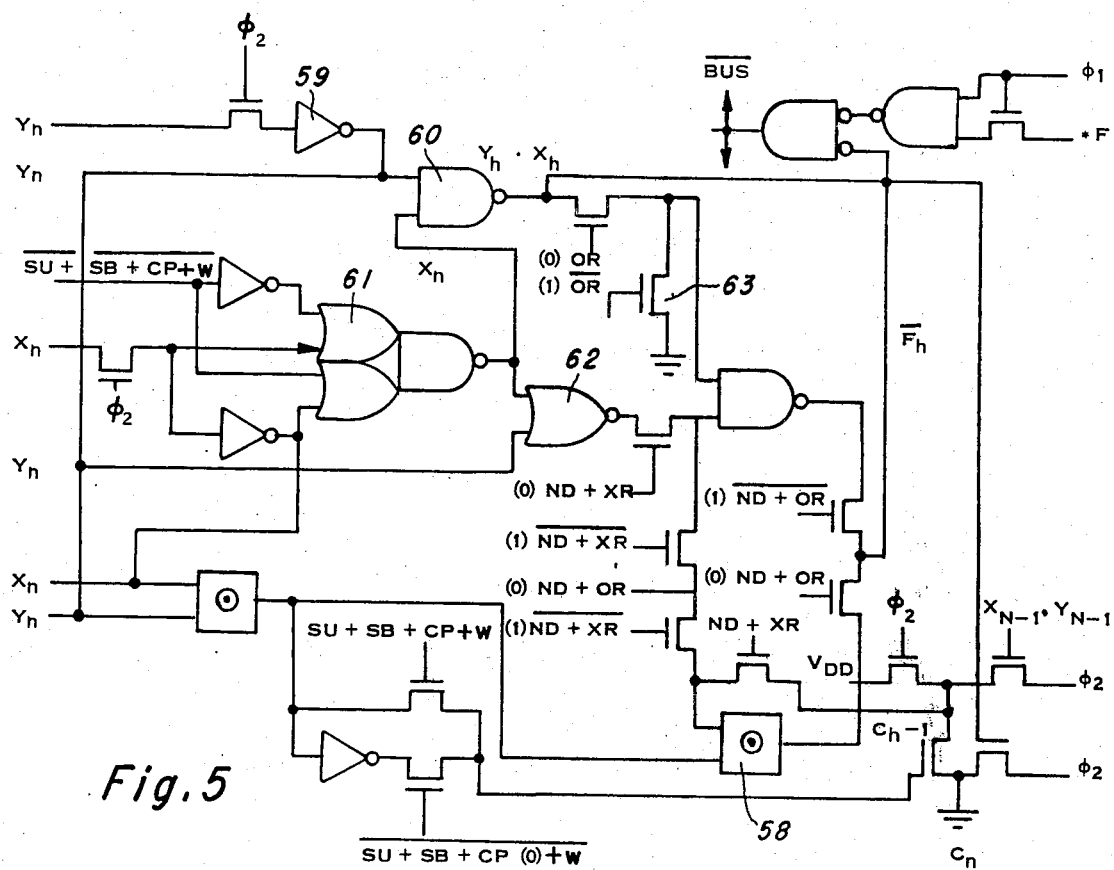

One bit of the arithmetic unit 32 is illustrated in FIG. 5. The arithmetic unit comprises inverters, shown generally at 59, NAND gates 60, NOR gates 62, complex gates 61, exclusive OR gates 58, and MOS transfer gates 63, interconnected in such a manner that in response to selected control signals, eight separate arithmetic operations may be executed. Operation of the logic to effect arithmetic operations add, subtract, and exclusive OR is described in the detailed description of U.S. Pat. No. 4,037,094.

What is claimed is:

1. In a digital processor system that includes an arithmetic logic unit for performing a plurality of different arithmetic and logic operations in response to coded instructions, the arithmetic logic unit being formed in a single semiconductor integrated circuit device, a parallel bus connected to the device, the arithmetic logic unit including:
   (a) decode means for receiving in parallel said coded instructions from said parallel bus and providing a plurality of multi-bit sets of parallel output control signals, each set respectively corresponding to a different one of the arithmetic and logic operations that can be performed by the system; and
   (b) logic circuit means for receiving said plurality of sets of parallel control signals, one set at a time, and selectively effecting logic operations corresponding to the selected operation, the logic circuit means also receiving parallel data inputs from two separate sources on the device loaded from said parallel bus, and producing a parallel multi-bit output representing the selected operation on the data inputs, the output being stored on the device and outputted via said parallel bus.

* * * * *

REEXAMINATION CERTIFICATE (3418th)

United States Patent [19]

Vandierendonck

[11] B1 4,225,934

[45] Certificate Issued Jan. 20, 1998

[54] MULTIFUNCTIONAL ARITHMETIC AND LOGIC UNIT IN SEMICONDUCTOR INTEGRATED CIRCUIT

[75] Inventor: Jerry L. Vandierendonck, Houston, Tex.

[73] Assignee: Texas Instruments, Inc., Dallas, Tex.

Reexamination Request:
No. 90/004,363, Sep. 13, 1996

Reexamination Certificate for:
Patent No.: 4,225,934
Issued: Sep. 30, 1980
Appl. No.: 815,871
Filed: Jul. 14, 1977

Related U.S. Application Data

[63] Continuation of Ser. No. 176,664, Aug. 31, 1971, Pat. No. 4,037,094.

[51] Int. Cl.[6] ................................................. G06F 7/50
[52] U.S. Cl. ................................................. 364/716.02
[58] Field of Search ................................ 364/716, 716.02

[56] References Cited

PUBLICATIONS

Lee L. Boysel and Joseph P. Murphy, "Four–Phase LSI Logic Offers New Approach to Computer Designer", Computer Design, Apr. 1970, pp. 141–146.

Lucas, "An Accumulator Chip", IEEE Trans. on Computers, vol. C–18, No. 2, Feb. 1969, pp. 105–114.

*Primary Examiner*—David H. Malzahn

[57] ABSTRACT

A computing system includes a central processor unit (CPU) in combination with external memory units. The CPU includes an arithmetic logic (ALU), an instruction register, a random access memory, and a control system for interconnecting the functional elements of the CPU via sequential use of a common parallel buss, enabling the CPU to be defined on a single chip. The ALU is capable of performing eight separate arithmetic and logic functions utilizing common logic gates.

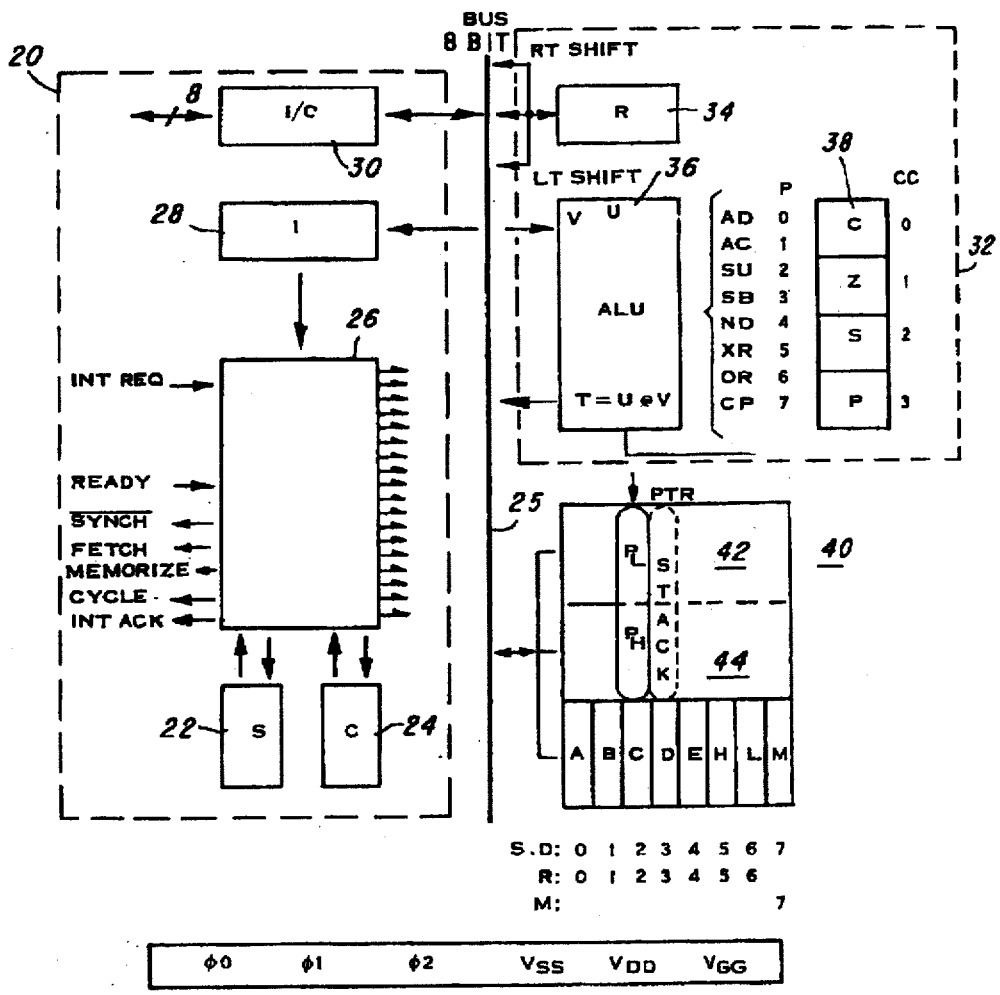

B1 4,225,934

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

New claims 2–16 are added and determined to be patentable.

1. In a digital processor system that includes an arithmetic logic unit for performing a plurality of different arithmetic and logic operations in response to coded instructions *obtained from a program memory*, the arithmetic logic unit being formed in a single semiconductor integrated circuit device, a parallel bus connected to the device, the arithmetic logic unit including:
   (a) decode means for receiving in parallel said coded instructions from said parallel bus and providing a plurality of multi-bit sets of parallel output control signals, each set respectively corresponding to a different one of the arithmetic and logic operations that can be performed by the system; and
   (b) logic circuit means for receiving said plurality of sets of parallel control signals, one set at a time, and selectively effecting logic operations corresponding to the selected operation, the logic circuit means also receiving parallel data inputs from two separate sources on the device loaded from said parallel bus, and producing a parallel multi-bit output representing the selected operation on the data inputs, the output being stored on the device and outputted via said parallel bus.

2. *In a digital processor system that includes an arithmetic logic unit for performing a plurality of different arithmetic and logic operations in response to coded instructions, the arithmetic logic unit being formed in a single semiconductor integrated circuit device, a parallel bus connected to the device:*
   *the arithmetic logic unit including*
      *(a) decode means for receiving in parallel said coded instructions from said parallel bus and providing a plurality of multi-bit sets of parallel output control signals, each set respectively corresponding to a different one of the arithmetic and logic operations that can be performed by the system, and*
      *(b) logic circuit means for receiving said plurality of sets of parallel control signals, one set at a time, and selectively effecting logic operations corresponding to the selected operation, the logic circuit means also receiving parallel data inputs from two separate sources on the device loaded from said parallel bus, and producing a parallel multi-bit output representing the selected operation on the data inputs, the output being stored on the device and outputted via said parallel bus; and*
   *the integrated circuit device further including an instruction register coupled to said parallel bus for receiving and storing said coded instructions, said instruction register also coupled to said decode means.*

3. *The system of claim 2, wherein said instruction register is coupled to said parallel bus independently of said logic circuit means.*

4. *The system of claim 3, wherein said separate sources are memory circuits, one of said memory circuits coupled to said parallel bus independently of said logic circuit means.*

5. *The system of claim 2, wherein the integrated circuit device includes a data path which extends from said parallel bus to said instruction register and which is external relative to said logic circuit means.*

6. *The system of claim 5, wherein said separate sources are memory circuits, and wherein the integrated circuit device includes a further data path which extends from said parallel bus to one of said memory circuits and which is external relative to said logic circuit means.*

7. *The system of claim 2, wherein the integrated circuit device includes an interface circuit connected between said parallel bus and said instruction register for selectively connecting said parallel bus to said instruction register.*

8. *The system of claim 7, wherein said separate sources are memory circuits, and wherein said interface circuit is connected between said parallel bus and one of said memory circuits for selectively connecting said parallel bus to said one memory circuit.*

9. *The system of claim 8, wherein the integrated circuit device includes a further parallel bus connected to said interface circuit, said instruction register and said one memory circuit.*

10. *In a digital processor system that includes an arithmetic logic unit for performing a plurality of different arithmetic and logic operations in response to coded instructions, the arithmetic logic unit being formed in a single semiconductor integrated circuit device, a parallel bus connected to the device:*
    *the arithmetic logic unit including*
       *(a) decode means for receiving in parallel said coded instructions from said parallel bus and providing a plurality of multi-bit sets of parallel output control signals, each set respectively corresponding to a different one of the arithmetic and logic operations that can be performed by the system, and*
       *(b) logic circuit means for receiving said plurality of sets of parallel control signals, one set at time, and selectively effecting logic operations corresponding to the selected operation, the logic circuit means also receiving parallel data inputs from two separate memory circuits on the device loaded from said parallel bus, and producing a parallel multi-bit output representing the selected operation on the data inputs, the output being stored on the device and outputted via said parallel bus; and*
    *one of said memory circuits coupled to said parallel bus independently of said logic circuit means.*

11. *In a digital processor system that includes an arithmetic logic unit for performing a plurality of different arithmetic and logic operations in response to coded instructions, the arithmetic logic unit being formed in a single semiconductor integrated circuit device, a parallel bus connected to the device:*
    *the arithmetic logic unit including*
       *(a) decode means for receiving in parallel said coded instructions from said parallel bus and providing a plurality of multi-bit sets of parallel output control signals, each set respectively corresponding to a different one of the arithmetic and logic operations that can be performed by the system, and*

(b) logic circuit means for receiving said plurality of sets of parallel control signals, one set at a time, and selectively effecting logic operations corresponding to the selected operation, the logic circuit means also receiving parallel data inputs from two separate memory circuits on the device loaded from said parallel bus, and producing a parallel multi-bit output representing the selected operation on the data inputs, the output being stored on the device and outputted via said parallel bus; and the integrated circuit device further including a data path which extends from said parallel bus to one of said memory circuits and which is external relative to said logic circuit means.

12. In a digital processor system that includes an arithmetic logic unit for performing a plurality of different arithmetic and logic operations in response to coded instructions, the arithmetic logic unit being formed in a single semiconductor integrated circuit device, a parallel bus connected to the device:

the arithmetic logic unit including
(a) decode means for receiving in parallel said coded instructions from said parallel bus and providing a plurality of multi-bit sets of parallel output control signals, each set respectively corresponding to a different one of the arithmetic and logic operations that can be performed by the system, and
(b) logic circuit means for receiving said plurality of sets of parallel control signals, one set at a time, and selectively effecting logic operations corresponding to the selected operation, the logic circuit means also receiving parallel data inputs from two separate memory circuits on the device loaded from said parallel bus, and producing a parallel multi-bit output representing the selected operation on the data inputs, the output being stored on the device and outputted via said parallel bus; and the integrated circuit device further including an interface circuit connected between said parallel bus and one of said memory circuits for selectively connecting said parallel bus to said one memory circuit.

13. In a digital processor system that includes an arithmetic logic unit for performing a plurality of different arithmetic and logic operations in response to coded instructions, the arithmetic logic unit being formed in a single semiconductor integrated circuit device, a first parallel bus connected to the device:

the arithmetic logic unit including
(a) decode means for receiving in parallel said coded instructions from said first parallel bus and providing a plurality of multi-bit sets of parallel output control signals, each set respectively corresponding to a different one of the arithmetic and logic operations that can be performed by the system, and
(b) logic circuit means for receiving said plurality of sets of parallel control signals, one set at a time, and selectively effecting logic operations corresponding to the selected operation, the logic circuit means also receiving parallel data inputs from two separate sources on the device loaded from said first parallel bus, and producing a parallel multi-bit output representing the selected operation on the data inputs, the output being stored on the device and outputted via said first parallel bus; and the integrated circuit device further including a second parallel bus and an interface circuit connected between said first parallel bus and said second parallel bus for permitting bidirectional communication between said first parallel bus and said second parallel bus.

14. The system of claim 13, wherein one of said sources is coupled to said second parallel bus for communication with said first parallel bus.

15. The system of claim 14, wherein the integrated circuit device includes an instruction register connected to said second parallel bus to receive said coded instructions, said instruction register also connected to said decode means.

16. The system of claim 13, wherein the integrated circuit device includes an instruction register connected to said second parallel bus to receive said coded instructions, said instruction register also connected to said decode means.

* * * * *